United States Patent
Ryat

[19]

[11] Patent Number: 6,081,396
[45] Date of Patent: Jun. 27, 2000

[54] MAGNETIC READ/WRITE HEAD THAT DETECTS OPEN AND SHORT-CIRCUITS

[75] Inventor: Marc Henri Ryat, Santa Clara, Calif.

[73] Assignee: SGS-Thomson Microelectronics S.A., Gentilly, France

[21] Appl. No.: 08/966,043

[22] Filed: Nov. 7, 1997

[30] Foreign Application Priority Data

Nov. 8, 1996 [FR] France ................... 96 13687

[51] Int. Cl.[7] .................. G11B 5/09; G11B 5/02
[52] U.S. Cl. ........................... 360/46; 360/67
[58] Field of Search .............. 360/46, 67; 324/523, 324/546

[56] References Cited

U.S. PATENT DOCUMENTS

| | | |
|---|---|---|
| 3,970,930 | 7/1976 | Vermolen . |
| 4,203,137 | 5/1980 | Beck et al. . |
| 4,533,965 | 8/1985 | Steinbaugh . |
| 5,087,884 | 2/1992 | Brannon . |
| 5,357,379 | 10/1994 | Gower . |
| 5,392,172 | 2/1995 | Yoshinaga et al. . |
| 5,457,391 | 10/1995 | Shimizu et al. . |

FOREIGN PATENT DOCUMENTS 0 341 117 A1  8/1989  European Pat. Off. .

OTHER PUBLICATIONS

Fujitsu Ltd, Patent Abstracts of Japan, "*Detecting Circuit for Defective Insulation of Magnetic Head*", Publication No. 61094212, May 1986.

Fujitsu Ltd, Patent Abstracts of Japan, "*Detection for Disconnection of Magnetic Head*", Publication No. 59178616, Sep. 1984.

Fujitsu Ltd, Patent Abstracts of Japan, "*Writing Circuit of Magnetic Head*", Publication No. 57189316, Nov. 1982.

Comput Basic Mach Technol Res Assoc, Patent Abstracts of Japan, "*Magnetic Head Assembly*", Publication No. 60000617, May 1985.

2244 Research Disclosure, Jul. 1986, No. 267, Emsworth, Hampshire, Great–Britain, 26755 "Disk File Defect Strategy".

*Primary Examiner*—W. Chris Kim
*Attorney, Agent, or Firm*—Theodore E. Galanthay; Allen, Dyer, Doppelt, Milbrath & Gilchrist, P.A.

[57] ABSTRACT

A read/write head for a magnetic medium magnetic is modified by the addition to it of a parallel-connected resistor and by the measurement of the difference in voltage at the terminals of this unit, on the one hand when the read/write head and the resistor are perfectly connected and, on the other hand, when one of the connections is in an open circuit condition or even in short-circuit condition with respect to ground. Consequently, a measurement is taken, preferably, of the state of connection of the read/write head when it is in read mode and not when it is in write mode. It is shown that far greater reliability in the detection of this type of defect is obtained, in avoiding false alarms.

25 Claims, 2 Drawing Sheets

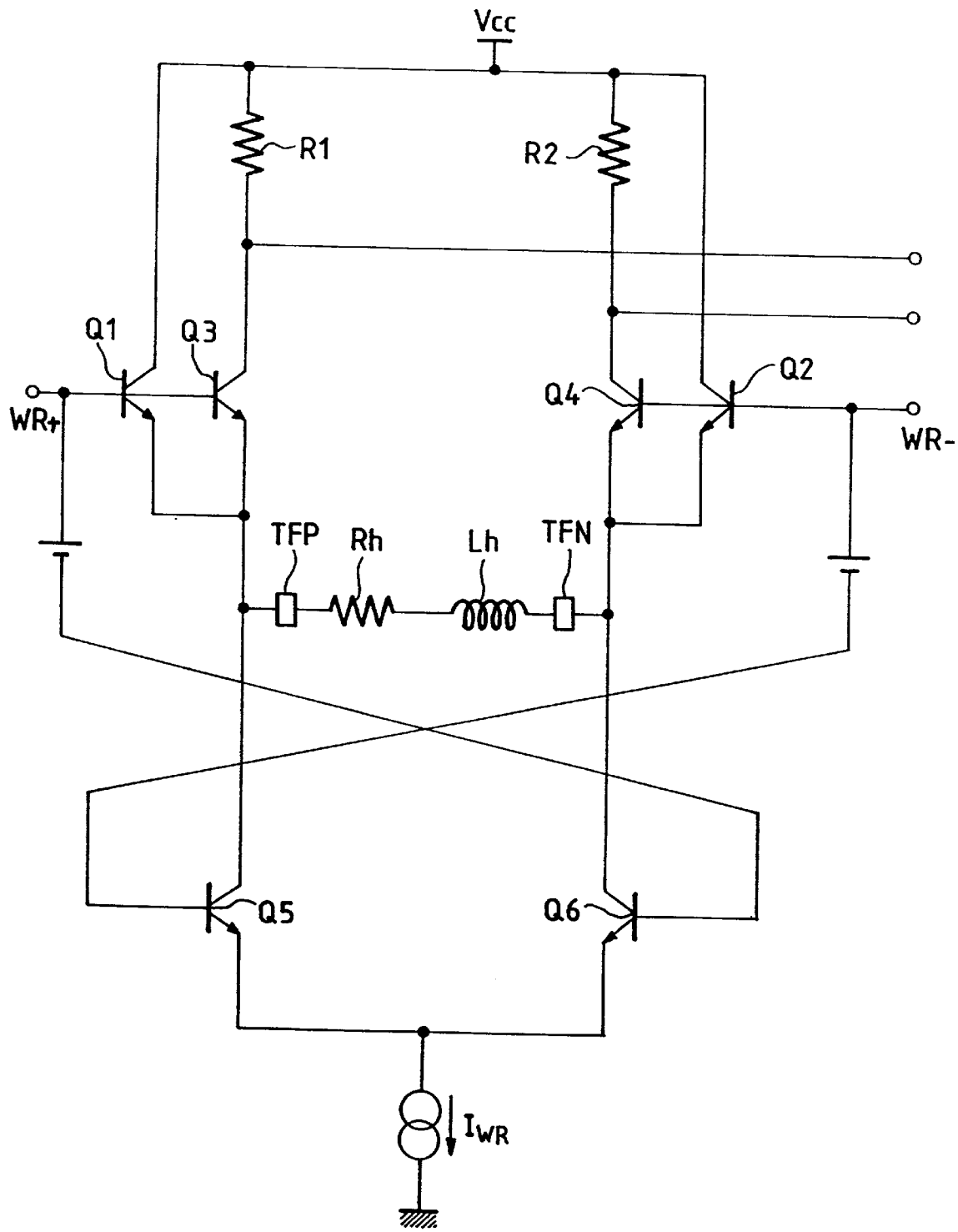
FIG_1
PRIOR ART

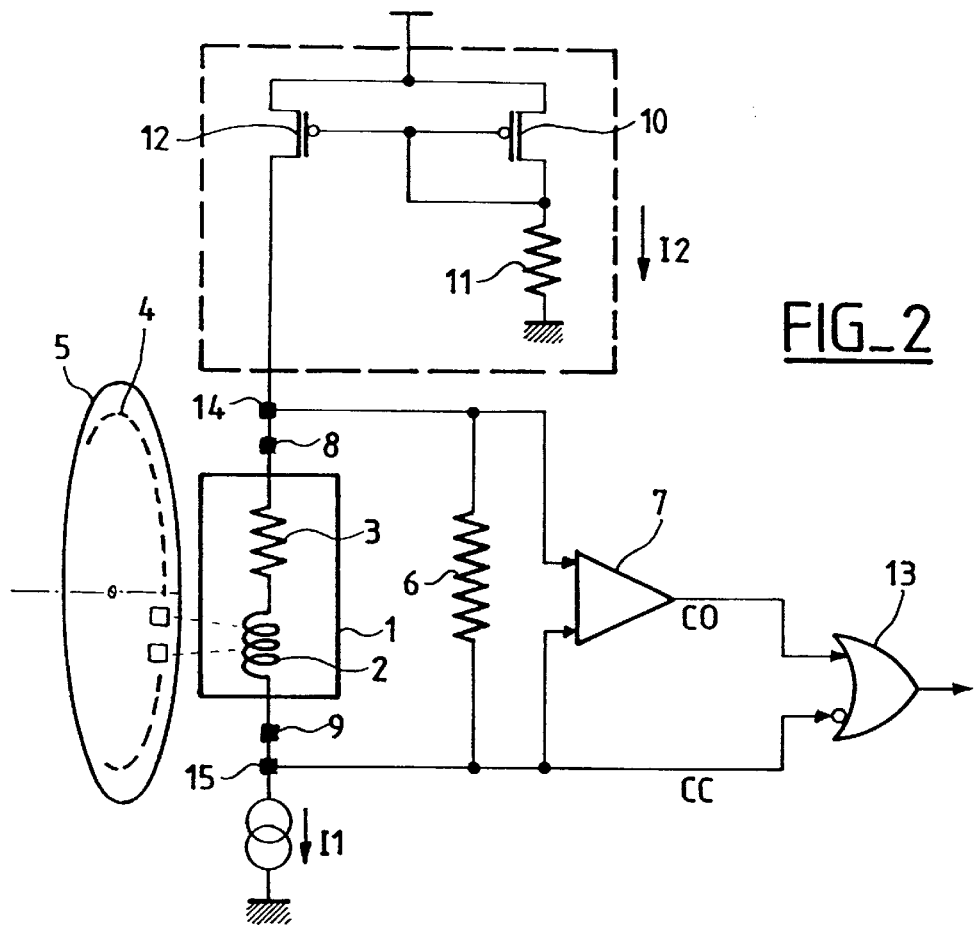
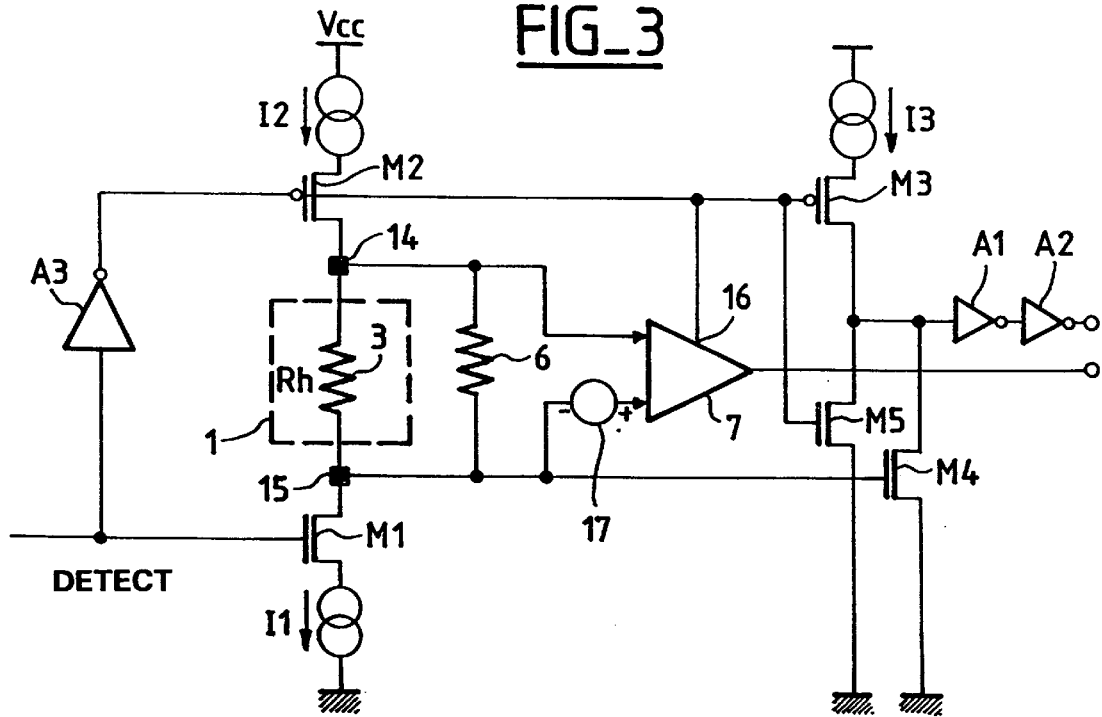

MAGNETIC READ/WRITE HEAD THAT DETECTS OPEN AND SHORT-CIRCUITS

FIELD OF THE INVENTION

The present invention is in the field of magnetic read/write heads, and more particularly, to such a head with a device to detect whether it is in a state of short-circuit or a state of open circuit at one of its terminals. The invention is aimed at overcoming the defects of reliability of similar detection devices available in the prior art.

BACKGROUND OF THE INVENTION

FIG. 1 shows a prior art device enabling a detection of whether a magnetic read/write head is in a short-circuit state or open circuit state at one of its input terminals. The assembly presented is a so-called H assembly. In its central part, it has the components Rh, Lh of a magnetic read/write head, representing its internal series resistor and its self-inductive impedance. Depending on the direction of a bit to be written in a magnetic medium placed before the head (near the impedance Lh), a pulse signal WR+ or WR− is applied to the bases of transistors respectively Q1 and Q6 or Q2 and Q5. These NPN type transistors are cascade-connected with each other and series-connected in an intermediate position with the head. If one of these pulses is positive it turns the corresponding pair of transistors on. The other signal is then null and places the other transistors in an open circuit. The result thereof is that the current flows into the self-inductance Lh in a direction dictated by the polarity of the signals applied.

In the example, this current is produced by a voltage source Vcc and is limited by a current source Iwr mounted at the foot of the H circuit before the ground. For practical reasons, it may become necessary to provide for the addition, in the transmission of the signals, of a negative shift in the control voltage of the transistors of the pair of transistors to be made conductive. These considerations which are only related to the technology of the transistors Q1, Q2, Q5 Q6 in no way modify their principle.

To ascertain that one of the terminals TFP or TFN of the head is either shorted-circuit or in an open circuit, each of these terminals is furthermore connected to the supply voltage Vcc by a transistor, Q3 or Q4. This transistor Q3 or Q4, which is of same type as the preceding transistors, is itself respectively series-connected with a biasing resistor R1 or R2. The transistors Q3 and Q4 are controlled by the control signals of the transistors Q1 and Q2 respectively. Measurement voltages are then taken at midpoints between the resistor R1 and the transistor Q3 or between the resistor R2 and the transistor Q4 respectively.

When the head is accurately connected, at the time of the application of one of signals WR+ or WR−, the voltage of one of these midpoints drops (without however reaching the ground potential) while the other one remains at the voltage Vcc. On the other hand if there is a short-circuit, on the side where this short-circuit is located the voltage falls to zero and this null signal is detected as a signal that reveals the defect. On the contrary, if one of the two terminals is in an open circuit condition, then the voltage at both midpoints remains equal to Vcc at the time of the application of the pulses WR+ or WR−.

This mode of operation has the main disadvantage of being dependent on the presence of the write signals WR+ or WR−. It thus enables the detection of the correct operation of the head only when one mode of writing is already in progress. In addition, all the parasitics appearing on the supply voltage and/or on the signals WR+ and WR− give rise to false detections. This means that the reliability of this detection device is relatively poor.

SUMMARY OF THE INVENTION

In the invention a completely different procedure is used by abandoning this type of detection circuit and making a comparator circuit connected firstly to the terminals of the magnetic read/write head and secondly, in parallel, to a resistor. The comparator is used to measure the voltage drop in the parallel assembly of the resistor added to the continuous internal impedance of the head. The value of this total resistance changes, of course, depending on whether the read head is itself in an open circuit condition at one of its terminals or whether one of its terminals is shorted-circuited to ground.

Preferably, the comparator is calibrated to work during a read mode: then a relatively low biasing current is made to flow into the read/write head. However, it would be possible, for example, by shifting the detection threshold of the comparator, to take account also of a current that would circulate in write mode, when the current flowing in the self-inductive impedance Lh is high, to cause a change-over of the orientation of the magnetic particles placed before the read/write head.

An object of the invention therefore is a method to detect the ground connection or the placing in an open circuit condition of one of the terminals of a magnetic read/write head based upon measuring that the voltage drop in a resistor parallel-connected with the head is greater than a threshold.

An object of the invention is also a magnetic read/write head provided with a device for the detection of its operating conditions. The device preferably comprises: a resistor parallel-connected with two terminals of the head, and a comparator connected at input to two terminals of the parallel-connected resistor Preferably, a logic circuit is connected at input firstly to the output of the comparator and secondly to a terminal of the parallel-connected resistor.

BRIEF DESCRIPTION OF THE DRAWINGS

The invention will be understood more clearly from the following description and from the appended figures. These figures are given purely by way of an indication and by no means restrict the scope of the invention. Of these figures:

FIG. 1 is a schematic circuit diagram of a prior art detection device that has already been described, FIG. 2 is a schematic circuit diagram of the circuit in accordance with the present invention, and FIG. 3 is a schematic circuit diagram in greater detail of the circuit in accordance with the present invention.

DETAILED DESCRIPTION OF THE PREFERRED EMBODIMENTS

FIG. 2 shows a magnetic read/write head according to the invention. This head comprises a read/write element 1 comprising essentially a radiating device 2 which is a coil. The device 2 is self-inductive. The element 1 also comprises an internal series-connected resistor represented herein by the reference 3. The value of the internal resistor of the element 1 is Rh. The value Rh can be very low, nevertheless, it always exists. The element 1 is designed to be placed before magnetic tracks 4 that are borne by a medium 5 traveling in front of the element. When a write operation has to be performed, a current is made to flow in the element 1 so that it radiates electromagnetic power likely to change over the orientations of the magnetic particles carried by the track 4. This current may flow in one direction or the other depending on the direction of the change-over to be dictated. In one example, an assembly to control the element 1 is of the type described in FIG. 1.

A description shall be given of the operation of the invention when the head is in read mode, At the end of this description, a brief account shall be given of the way in which the head of the invention can be modified so that its mode of detection functions also during the writing. During the reading, the element 1 is in principle not supplied with power. Both its terminals are connected to a read circuit that is not shown. The magnetic particles, with their orientations, move before the head 1 and induce a current in the coil 2. This current is detected by the read circuit.

In the invention, furthermore, the element 1 is biased by a current I1, for example, by being connected to Vcc and to ground by at least one current source I1. Furthermore, the two terminals 14 and 15 of a resistor 6 with a value Rd are connected to the terminals 8 and 9 of the element 1. The two terminals 14 and 15 are also connected to the inputs of a comparator 7. It is preferred to make the value Rd of the resistor 6 far greater than the value of the resistor 3. In one example, the ratio between the values of these two resistors is equal to at least 10. However, by adopting different settings for the detection threshold of the comparator 7 it will be shown that it is even possible to consider having a value, for the resistor 6, that is smaller than the value of the resistor 3.

If one of terminals 8 or 9 of the element 1 is not connected to the terminals 14 and 15 of the head (should the head be in an open circuit condition), then no current flows through the resistor 3. The resistor 6 then comes into play only to let through the biasing current I1. This current I1 then prompts a greater voltage drop I1×Rd, whereas otherwise it would prompt a voltage drop I1×Rd×Rh/(Rd+Rh). By seeing to it that the biasing current is the same in every case, a difference is obtained in the voltage drop at the terminals of the resistor 6, depending on whether the element 1 is or is not in an open circuit condition at one of its terminals. Should the value Rd of the resistor 6 be far greater that of the resistor 3, the voltage drop at the terminals of the resistor 6 greatly increases (since the current is constant) when the head is in open circuit condition. If Rd is far greater than Rh, the voltage drop is I1×Rh without the open circuit and is I1×Rd with the open circuit. If Rd is not far greater than Rh, the difference in voltage drops is in the same direction. Nevertheless it is smaller. The increase in this voltage drop is used in every case to make the comparator 7 switch over.

In practice, the comparator 7 may have an internal imbalance as a result of which, so long as the voltage drop is about I1×Rh, it is in one state and, when it is equal to I1×Rd, it is in another state. This imbalance may be obtained, for example, by making the comparator 7 in the form of a differential amplifier with two transistors whose gates respectively receive the input signals from the comparator In one example, these two transistors would have different W/L ratios, or different concentrations of implantation, or again possibly one of the two arms of the differential amplifier would be unbalanced with respect to the other arm by a complementary impedance. In one example, a signal CO available at output of the comparator 7 is equal to zero if there is no open circuit, and is equal to 1 if there is one open circuit.

It is, of course, possible also to make this detection system work during the writing. It is quite simply sufficient to take account, in addition to the current I1, of the current necessary for the write operation, and to establish thresholds corresponding to this different current in a comparator which would be also connected to the terminals of the resistor 6. The fact of carrying out the detection during the read stages that precede the writing makes it possible to superimpose the current I1 on the fluctuating current that results from the reading. Preferably this current I1 (which is a direct current) will be far greater than the read pulse current. A decoupling of reading could furthermore be arranged with a series capacitor in the read circuit to remove the voltage DC component resulting from the passage of the current I1 through the internal resistor Rh.

When one of the terminals 8 or 9 of the element 1 is shorted-circuit with ground, benefit is furthermore derived from the fact that a second current source, I2, which is also series-connected with the head 1, is likely to deliver more current than the current source I1. The current source I2 is placed between Vcc and the ground, on the other side of the element 1 with respect to the current source I1. The source I2 is connected to Vcc.

An example of such a current source I2 is shown in FIG. 2. It comprises a first PMOS type transistor 10 series-connected with a resistor 11 and biased to the limit of conduction by the connection of its gate to its source. The transistor 10 and the resistor 11 are furthermore supplied between Vcc and ground. The gate of the transistor 10 is furthermore connected to the gate of a transistor 12 of the same PMOS type, also supplied by Vcc. The two transistors 10 and 12 are mounted in a current mirror configuration and, consequently, the current that flows in the transistor 12 is equal or at least proportional to the current flowing in the transistor 10. The same assembly can be made for the source I1.

In the invention, the source I1 preferably cannot deliver as much current as the source I2. For example, the source I2 can deliver twice as much current as the source I1. This can be due to the dimensions of the transistors, equivalent to 10 and 12, of the source I1. In normal times, the source I1 will thus be saturated and in practice the potential of the terminal 15 will be in a high non-null state with respect to the ground. On the other hand, if one of two terminals 8 or 9 of head 1 is shorted-circuit with ground, the potential of the terminal 9 will be null, and, with it, the potential of the terminal 15.

Therefore, as much as the output of the comparator 7 delivers a signal CO representing the existence of an open circuit in the element 1, the terminal 9–15 now, to the same extent, delivers a null signal or a high signal CC, respectively representing a short-circuit or the absence of a short-circuit on the element 1. To detect the accurate operation of the element 1, it is enough to lead these two signals CO and CC to the two inputs of a logic gate 13 performing an OR function. For obvious reasons, the signal CC enters an inverter input of the OR gate.

Thus, if there is no open circuit, the signal CO is null and if there is no short-circuit, the complemented signal CC is also null. In this case, the OR gate 13 delivers a null signal that can be exploited, especially after it has been made to pass through an inverter. On the other hand, as soon as one of the signals CO or CC changes state, the OR gate 13 delivers a signal in the state 1.

It is important to note that the element 1 has the connection terminals 8 and 9 but that, furthermore, the device to detect the operating conditions of the read head has corresponding terminals 14 and 15. The terminals 14 and 15 are connected in a non-detachable assembly to the other elements of the circuit shown, even if the element 1 may itself be detachable. Possibly, the element 1 is connected in a hybrid manner (for example with floating wires) to enable it to be shifted opposite the medium 5 when different tracks are to be explored.

FIG. 3 shows a preferred exemplary embodiment of a read head according to the invention with a start-up circuit and a shaping circuit. The start-up circuit comprises, in one example, an NMOS type transistor M1 interconnected between the terminal 15 and the current source I1, and a PMOS type transistor M2 interconnected between the terminal 14 and the current source I2. It also comprises an inverter A3 whose input is connected to the gate of the transistor M1 and whose output is connected to the gate of the transistor M2. A detection signal DETECT is furthermore applied to the input of the inverter A3 when it is sought to prompt a detection. This signal turns the transistors M1 and M2 on so that the circuit shown in FIG. 3 behaves like that shown in FIG. 2. On the other hand, if the command DETECT is at a low level, firstly there is no detection (for example for the write periods if it has been decided not to make any detection during these specific periods). Secondly, with the command DETECT at the low level, the comparator 7 can be reset at zero by applying the signal DETECT inverted to a resetting input 16 of the comparator 7. In this way, apart from the operations for starting up the detection circuit, there is no further consumption of current in the element 1.

FIG. 3 also shows a shaping circuit for the output signals. This circuit comprises a current source I3, for example of same type as the preceding ones, which delivers current into an NMOS type transistor M3 itself cascade-connected with an NMOS type transistor M5. The inverted signal DETECT is applied to the gates of the transistors M3 and M5. When detection is in progress, the midpoint of the transistors M3 and M5 is thus taken to a high potential. If not, it is null. The midpoint of the transistors M3, M5 is furthermore connected to the drain of an NMOS type transistor M4 whose source is connected to ground. The gate of the transistor M4 receives the signal CC from the terminal 15. The transistor M4 has the effect of inverting the value of the signal CC available at the terminal 15. This inverted signal is available at the drain of the transistor M4. This drain of the transistor M4 is furthermore preferably connected to a cascade of two inverters A1 and A2, designed to ensure the shape and the level of the inverted signal CC at output.

FIG. 3 again shows that a voltage source 17 has been inserted in series in one of the inputs of the comparator 7 to take account of the proposed difference between the terminals 14 and 15 when the operation is normal. When this operation is normal, this voltage difference is equal to slightly more than I1×Rh. Preferably, the voltage imposed by the voltage source 17 will be higher and will preferably be intermediate just at midpoint between the values I1×Rh and I1×Rd. In other words, it is also possible to make an unbalanced comparator 7. Of course, the current sources I1, I3 and their starting-up transistors M1 to M3, as also M4, which are made in the form of MOS type field-effect transistors, can be partially replaced by resistors or even transistors of different types. In the same way the difference effect caused by the differences in conduction of the sources I1, I2 can be overlooked if the operation is limited to the detection of an open circuit. Moreover since the head has a symmetrical shape, it is possible to reverse the position of the element 1 between the terminals 14 and 15. In addition rather than carrying out a detection on the terminal 15, it is also possible detect the presence of the short-circuit at the terminal 14. From this point of view, FIG. 2 shows the essential principle of the invention.

That which is claimed:

1. A magnetic read/write head and associated circuit comprising:
    a head having two terminals,
    a resistor parallel-connected with the two terminals of the head;
    a comparator having two input terminals connected to the resistor, and having an output; and
    a logic circuit having a first input connected to the output of the comparator and having a second input connected to a terminal of the resistor.

2. A magnetic read/write head and associated circuit according to claim 1, further comprising:
    a first current source supplying a first terminal of the head; and
    a second current source supplying a second terminal of the head, the second current source having a value of current delivery greater than that of the first current source.

3. A magnetic read/write head and associated circuit according to claim 2, wherein the second current source is capable of delivering current twice as great as the current delivered by the first source.

4. A magnetic read/write head associated circuit according to claim 2, further comprising a circuit for starting up the first and second current sources, the comparator, and the logic circuit.

5. A magnetic read/write head and associated circuit according to claim 1, further comprising a circuit for shaping output signals from said logic circuit.

6. A magnetic read/write head and associated circuit according to claim 1, wherein the resistor has a resistance at least ten times an internal resistance of the head.

7. A magnetic read/write head and associated circuit according to claim 1, wherein the resistor has a resistance higher than a value of a continuous internal resistance of the head.

8. A circuit for a magnetic read/write head of a type comprising a head having two terminals, the circuit comprising:
    a resistor for being parallel-connected with the two terminals of the head; and
    detecting means connected to said resistor for detecting one of a short-circuit and open circuit at a terminal of the head wherein said detecting means comprises:
        a comparator having two input terminals connected to the parallel-connected resistor, and having an output; and
        a logic circuit having a first input connected to the output of the comparator and having a second input connected to a terminal of the parallel-connected resistor.

9. A circuit according to claim 8, further comprising:
    a first current source supplying a first terminal of the head; and
    a second current source supplying a second terminal of the head, the second current source having a value of current delivery greater than that of the first current source.

10. A circuit according to claim 9, wherein the second current source is capable of delivering current twice as great as the current delivered by the first source.

11. A circuit according to claim 9, further comprising a circuit for starting up the first and second current sources.

12. A circuit according to claim 8, further comprising a circuit for shaping output signals from said logic circuit.

13. A circuit according to claim 8, wherein the resistor has a resistance at least ten times an internal resistance of the head.

14. A circuit according to claim 8, wherein the resistor has a resistance higher than a value of a continuous internal resistance of the head.

15. A circuit for a magnetic read/write head of a type comprising a head having two terminals, the circuit comprising:
   a resistor for being parallel-connected with the two terminals of the head;
   a comparator having two input terminals connected to the resistor, and having an output; and
   a logic circuit having a first input connected to the output of the comparator and having a second input connected to a terminal of the resistor.

16. A circuit according to claim 15, further comprising:
   a first current source supplying a first terminal of the head; and
   a second current source supplying a second terminal of the head, the second current source having a value of current delivery greater than that of the first current source.

17. A circuit according to claim 16, wherein the second current source is capable of delivering current twice as great as the current delivered by the first source.

18. A circuit according to claim 16, further comprising a circuit for starting up the first and second current sources, the comparator, and the logic circuit.

19. A circuit according to claim 15, further comprising a circuit for shaping output signals from said logic circuit.

20. A circuit according to claim 15, wherein the resistor has a resistance at least ten times an internal resistance of the head.

21. A circuit according to claim 15, wherein the resistor has a resistance higher than a value of a continuous internal resistance of the head.

22. A method for operating a magnetic read/write head of a type comprising a head having two terminals, the method comprising the steps of:
   parallel connecting a resistor with the two terminals of the head;
   detecting one of a short-circuit and open circuit at a terminal of the head using the parallel connected resistor;
   providing a comparator having two input terminals connected to the parallel-connected resistor, and having an output; and
   providing a logic circuit having a first input connected to the output of the comparator and having a second input connected to a terminal of the parallel-connected resistor.

23. A method according to claim 22, further comprising the steps of:
   supplying a first current to a first terminal of the head; and
   supplying a second current to a second terminal of the head, the second current having a greater value than the first current.

24. A method according to claim 23, wherein the step of supplying the second current comprises supplying a second current twice as great as the first current.

25. A method according to claim 22, further comprising the step of shaping output signals.

* * * * *